T. L. LUDERS.
Assignor by mesne assignments to George Draper & Sons.
BOBBIN AND THREAD-HOLDERS FOR SPINNING MACHINES.
No. 7,579. Reissued March 27, 1877.
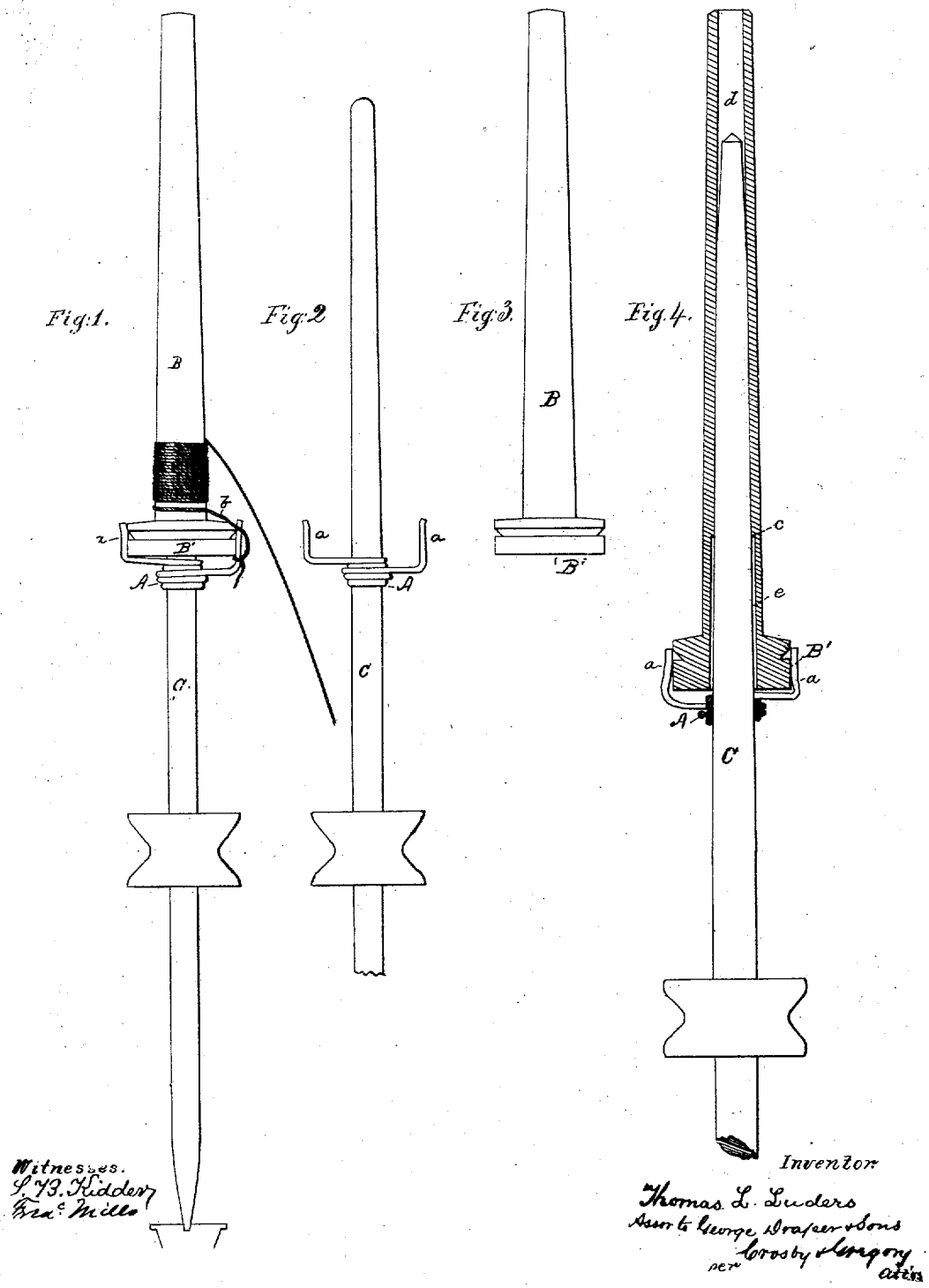
Witnesses.
S. H. Kidder
Geo. Mills
Inventor
Thomas L. Luders
Assr to George Draper & Sons
per Crosby & Gregory
Attys
THE NORRIS PETERS CO., PHOTO-LITHO., WASHINGTON, D. C.

UNITED STATES PATENT OFFICE.

THOMAS L. LUDERS, OF PHILADELPHIA, PENNSYLVANIA, ASSIGNOR, BY MESNE ASSIGNMENTS, TO GEORGE DRAPER & SONS.

IMPROVEMENT IN BOBBIN AND THREAD HOLDERS FOR SPINNING-MACHINES.

Specification forming part of Letters Patent No. 83, 354, dated October 20, 1868; reissue No. 7,579, dated March 27, 1877; application filed March 16, 1877.

*To all whom it may concern:*

Be it known that I, THOMAS L. LUDERS, now of Philadelphia, in the county of Philadelphia and State of Pennsylvania, but formerly of Olney, in the county of Richland and State of Illinois, have made a certain new and useful invention, having reference to machinery for spinning, of which the following is a specification:

My invention relates, first, to an improved method of holding a bobbin on a revolving spindle, so that it may be secured in suitable position thereon, and be rotated therewith; second, to provide means for fastening or detaining the end of the thread or slubbing, after removing the full bobbin, and while drawing out and twisting the first yarn wound on an empty bobbin; and, thirdly, to an improved combination of the bobbin and spindle, so that they can be successfully used with greater advantage of length of traverse, speed, and steadiness of rotation than heretofore attained.

Figure 1 is a side elevation of a spinning-machine spindle with my invention applied; Fig. 2, the spindle; Fig. 3, the bobbin detached, and Fig. 4 a section of the bobbin upon the spindle shown in Fig. 1.

Similar letters of reference indicate like parts in the figures.

In drawing out and twisting a thread, yarn, or slubbing, just after doffing, it is customary to hold the end of the same by wrapping it upon the spindle below the bobbin, or around the bobbin itself, which process is attended with loss and waste, by reason of the breaking or slipping of the wrapped end.

One object of this invention is to secure the bobbin in place upon the spindle in an improved manner, and fasten the end of the thread, yarn, or slubbing without incurring the above-mentioned loss and waste; and to these ends, I apply to the spindle a peculiar holder for the bobbin and the thread, consisting of a piece of elastic wire coiled tightly upon, and so as to rotate with, the spindle, and terminating in two salient arms, which grasp the base of the bobbin and assist, by their frictional adhesion thereon, to rotate it with the spindle. At the same time the arms constitute a means for fastening the end of the thread while being drawn out and twisted, after placing a new bobbin upon the spindle.

The bobbin is so extended above the top of the spindle as to permit the length of the traverse of the yarn on the bobbin to be materially increased, without adding to the length and weight of the spindle. This increases the capacity of the spindle materially, reduces its tendency to vibration, and lessens the power required to drive it below what would be required if the spindle extended to the top of the bobbin.

It has been customary to hold and drive bobbins on tapering spindles by frictional adhesive bearings within the inner surface of the bobbin, arranged either at the extreme upper and lower ends of the bobbin, or at the upper end, and an intermediate point between the two ends. My frictional holding portions are at an intermediate point within the bobbin, and at the bottom of the bobbin, outside of it, thereby sustaining the bobbin at two points, but with such reference to the length of the bobbin as will permit me to extend the bobbin a considerable distance above the top of the spindle. My lower bearing being an external one, I am enabled to hold it more securely.

In the drawing, A represents the holder, which is secured in proper position upon the spindle C, to hold and support the bobbin B, with relation to the spindle, as shown in Figs. 1 and 4. The device A is a piece of elastic wire, wrapped sufficiently tight around the spindle to rotate therewith and carry the bobbin with it. The arms *a a*, in which the wire terminates, are bent outward at the end, in order to readily admit the head B′ of the bobbin, and yet adapt such arms to tightly grasp said head when the latter is fairly introduced between them.

The end of the thread *b* may be applied to either of the elastic arms *a a* in the manner shown in Fig. 1, and such arm will hold the thread firmly until the bobbin is taken off the spindle, when the thread will readily slip from the end of the arm. Within the bobbin (see Fig. 4) is an intermediate adhesive bearing, *c*, which holds it steadily on the spindle, preventing independent lateral motion of the bobbin thereon, and it and the holder rotate the bobbin and its load with the spindle.

The holder is shown crowded down to its lowest position upon the spindle, and, as shown, the length of the spindle above the holder, below which the bobbin cannot descend, is materially less than the length of the bobbin, and a chamber, *d*, of considerable size, is left at the top of the bobbin. From the intermediate bearing *c*, downward to the end of the bobbin, it does not touch the spindle, because of the chamber *e* being larger than the diameter of the spindle within it.

I am aware that a wire has been coiled around the spindle with its upward-projecting end occupying a notch in the head of the bobbin, to cause the latter to rotate with the spindle.

I am also aware that a bobbin provided with an intermediate adhesive bearing, with chambers above and below it, is not new, such a construction being shown in United States Letters Patent of Levi Ferguson, dated May 1, 1866, numbered 54,465.

What I claim as new, and my invention, is—

1. The coiled-wire holder A, having outwardly-curved arms *a a*, constructed as described, combined with the rotary spindle and the bobbin, and adapted to serve as a holder for the bobbin and for the thread, as set forth.

2. A bobbin provided with a centrally-located interior adhesive bearing, and with a frictional bearing at its lower end, combined by means of such bearings with a rotating spindle, substantially as described.

3. In combination, the bobbin, having the centrally-located adhesive bearing, and the part of the spindle within the bobbin made shorter than the bobbin, substantially as described.

4. A bobbin, combined with the spindle by means of interior and exterior frictional bearings, and provided with a chamber between them, substantially as described.

THOS. L. LUDERS

Witnesses:

JOHN A. WIEDERSHEIM,

H. E. HINDMARSH.